No. 801,999. PATENTED OCT. 17, 1905.
G. LOFFI.
TROLLEY WHEEL.
APPLICATION FILED JAN. 7, 1905.
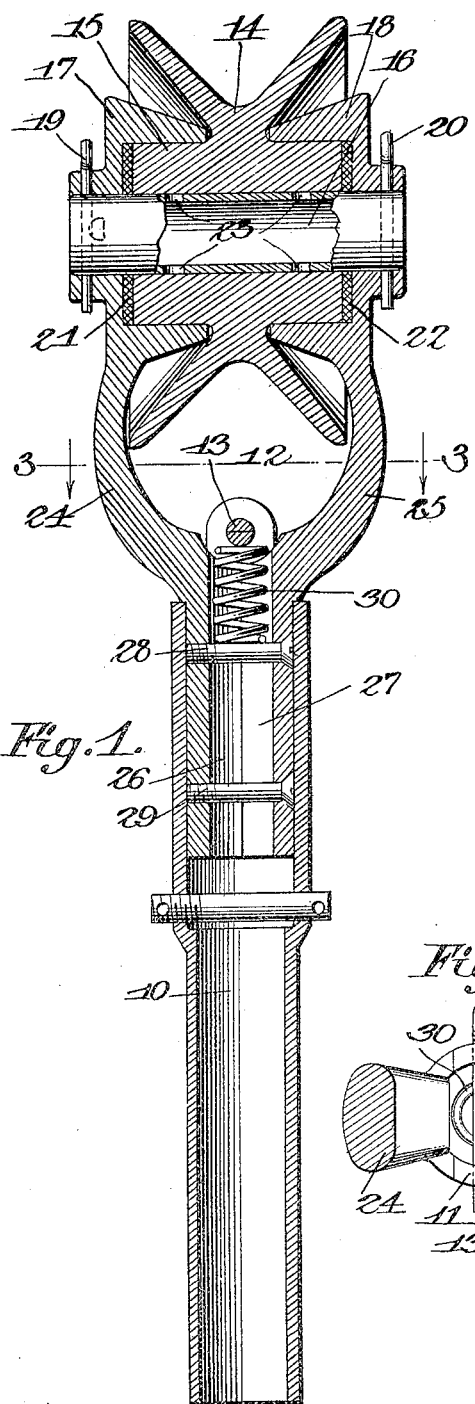
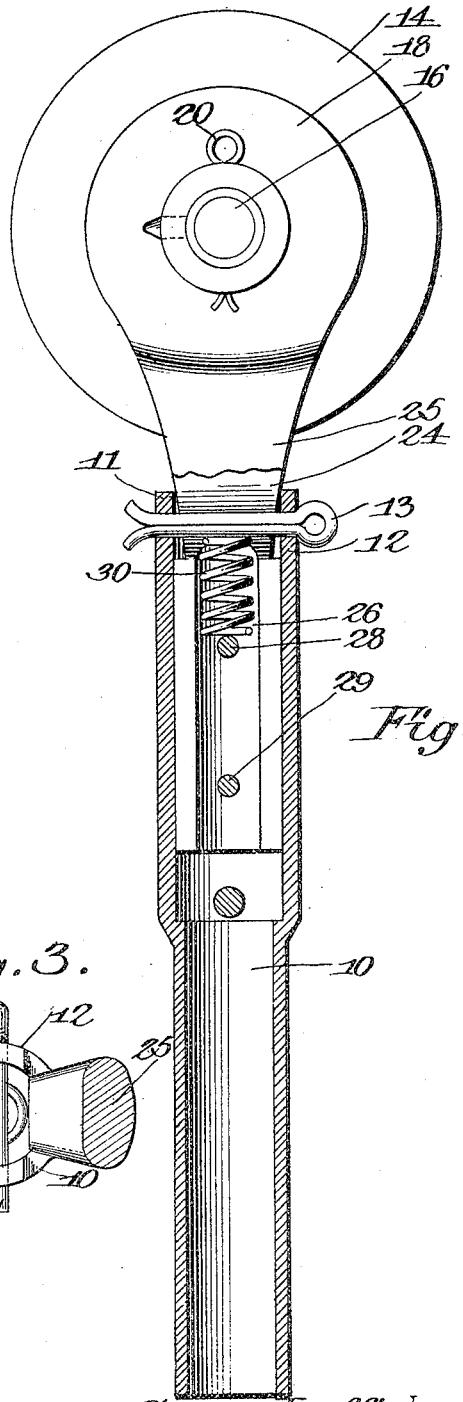
Witnesses
George Loffi, Inventor.
Attorneys

UNITED STATES PATENT OFFICE.

GEORGE LOFFI, OF NORWALK, OHIO.

TROLLEY-WHEEL.

No. 801,999.  Specification of Letters Patent.  Patented Oct. 17, 1905.

Application filed January 7, 1905. Serial No. 240,065.

*To all whom it may concern:*

Be it known that I, GEORGE LOFFI, a citizen of the United States, residing at Norwalk, in the county of Huron and State of Ohio, have invented a new and useful Trolley-Wheel, of which the following is a specification.

This invention relates to the trolley-wheels employed in overhead electric-railway systems, and has for its object to improve the construction and increase the efficiency and durability of devices of this character.

With these and other objects in view, which will appear as the nature of the invention is better understood, the same consists in certain novel features of construction, as hereinafter fully described and claimed.

In the accompanying drawings, forming a part of this specification and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a longitudinal sectional elevation, and Fig. 2 is a side elevation partially in section. Fig. 3 is a transverse section on the line 3 3 of Fig. 1.

The improved device comprises a tubular socket member 10 for attachment to the trolley-pole, which is not shown, as it forms no part of the present invention, the upper end of the socket having spaced ears 11 12 to receive a transverse pin 13, preferably of the "split" form, as shown.

The trolley-wheel 14 is formed with a central hub 15, through which a hollow axle 16 projects and on which the wheel rotates.

Bearing upon the opposite ends of the hub 15 are bearings 17 18, the bearings also receiving the ends of the axle 16, to which they are secured by pins 19 20, so that the axle is prevented from turning in the bearings.

Flexible packing-washers of rubber, felt, leather, or the like are interposed, as at 21 22, between the ends of the hub 15 and the inner faces of the bearings 17 18.

The hollow axle is supplied with cotton-waste, wool, or other similar material to hold the lubricating compound and is also provided with a sufficient number of apertures 23 to permit the lubricant to escape against the interior of the hub 15.

Lubricant may be supplied to the interior of the axle by any well-known or approved means.

Depending from the bearings 17 18 are arms 24 25, converging and terminating in half-sockets 26 27 for rotatively fitting into the upper end of the socket member 10.

The two parts of the portions 26 27 are connected by transverse screw-pins 28 29, and between the upper screw-pin and the transverse pin 13 a spring 30 is disposed, thus exerting its force to maintain the "trolley-head" in the "socket" and permitting a certain degree of yieldableness thereto, as will be obvious.

The arms 24 25 are reduced in width adjacent to the ears 11 12, between which they project to permit a limited degree of rotative movement between the trolley-head and socket, while the distance between the adjacent portions of the trolley-head and transverse pin 13 also permits a limited amount of longitudinal movement and controlled by the spring 30.

It will thus be obvious that a strong and durable trolley-wheel support is produced which will yield sufficiently to adapt itself to variations and irregularities in the trolley-wire, and thus avoid the troublesome "jumping" or "riding" the trolley-wire so common in trolley-wheels as ordinarily constructed and mounted.

Having thus described the invention, what is claimed is—

In a trolley, the trolley-wheel having a lateral hub, bearings engaging the opposite ends of said hub and supporting an axle extending through the same, said bearings having converging arms united at their extremities and formed into a longitudinal bearing, a pole-socket for receiving said longitudinal bearing and provided with spaced ears extending in advance of the longitudinal socket, a pin disposed through said ears and a spring bearing terminally against said pin and the longitudinal bearing.

In testimony that I claim the foregoing as my own I have hereto affixed my signature in the presence of two witnesses.

GEORGE LOFFI.

Witnesses:
LEONARD LOFFI,
LOUIS W. WICKHAM.